United States Patent [19]
Sun

[11] Patent Number: 5,247,623
[45] Date of Patent: Sep. 21, 1993

[54] AUTOMATIC MULTIPLE PERSONAL COMPUTER/COMPUTER PRINTER CONNECTING SYSTEM

[75] Inventor: Li-Shin Sun, Taipei, Taiwan

[73] Assignee: Primax Electronics Ltd., Taipei, Taiwan

[21] Appl. No.: 745,299

[22] Filed: Aug. 15, 1991

[51] Int. Cl.⁵ .................................................. G06F 13/14
[52] U.S. Cl. .................................. 395/325; 364/231.5; 364/DIG. 1
[58] Field of Search ............... 395/325, 725, 275, 250; 364/231.5, DIG. 1

[56] References Cited

U.S. PATENT DOCUMENTS

| | | | |
|---|---|---|---|
| 3,805,251 | 4/1974 | Morris et al. | 395/275 |
| 4,125,874 | 11/1978 | Higashide et al. | 395/275 |
| 4,839,793 | 6/1989 | Brunk | 395/275 |
| 4,941,089 | 7/1990 | Fischer | 395/325 |
| 5,031,115 | 7/1991 | Hayashi | 395/101 |
| 5,101,496 | 3/1992 | Hayashi | 395/725 |

Primary Examiner—Allen R. MacDonald
Assistant Examiner—Glenn A. Auve
Attorney, Agent, or Firm—Sughrue, Mion, Zinn, Macpeak and Seas

[57] ABSTRACT

An automatic multiple personal computer/computer printer connecting system is used to connect a plurality of personal computers to a plurality of computer printers, and includes a transmitter interface circuit connected to each personal computer and a receiver interface circuit connected to each computer printer. The connecting system permits several personal computers to commonly share several computer printers.

12 Claims, 7 Drawing Sheets

AUTOMATIC MULTIPLE PERSONAL COMPUTER/COMPUTER PRINTER CONNECTING SYSTEM

BACKGROUND OF THE INVENTION

1. Field of the Invention

This invention relates to a personal computer/computer printer connecting system, more particularly to an automatic multiple personal computer/computer printer connecting system to connect a plurality of personal computers to a plurality of computer printers.

2. Description of the Related Art

Presently, while the number of personal computers used in offices and schools increases, it is not uncommon to have a relatively large ratio of personal computers to computer printers. This means that a large number of personal computers must share a relatively small number of computer printers. In order to help resolve this problem, a data switch is provided to electrically connect a computer printer to several personal computers. The two types of data switches currently available are the manual data switch and the automatic data switch. The disadvantages of using the conventional data switches are as follows:

1. When using the manual data switch, the personal computer must be kept close to the computer printer and to the data switch to facilitate the use and operation thereof and to prevent a user from having to run back and forth to the vicinity of the computer printer and data switch.

2. The automatic data switch eliminates the need for manually operating a switch. However, the automatic data switch requires a plurality of electrical wires to connect the same to each personal computer. Thus, a lot of research and preparation is needed to properly install the electrical wires so as to prevent the wires from becoming entangled. Furthermore, installation of the electrical wires is time consuming and long lengths of electrical wires are inadvisable. Moreover, the automatic data switch cannot be used to connect a plurality of computer printers.

From the foregoing, it can be concluded that there is a need to modify existing data switches. In addition, since there are different kinds of computer printers available, (such as laser printers, Chinese character printers, and colored plotters for printing drawings), it is preferred that a plurality of personal computers be connected to several different types of computer printers in such a manner that the user of each personal computer can select the particular type of computer printer which he wishes to use.

SUMMARY OF THE INVENTION

Therefore, the objective of the present invention is to provide an automatic multiple personal computer/computer printer connecting system which can overcome the drawbacks commonly associated with the above mentioned conventional data switches.

More specifically, the main objective of the present invention is to provide an automatic multiple personal computer/computer printer connecting system which permits a plurality of personal computers to commonly use a plurality of computer printers.

Another objective of the present invention is to provide an automatic multiple personal computer/computer printer connecting system which permits electrical connection between a personal computer and a computer printer even though they are spaced far apart.

Accordingly, the preferred embodiment of a connecting system to connect a plurality of personal computers to a plurality of computer printers, comprises: a transmitter interface circuit electrically connected to one of the personal computers and including a means for detecting and informing said one of the personal computers as to which one of the computer printers is in use, and a data transmitting means to generate and transmit a printer identification code of a selected one of the computer printers when none of the computer printers is in use and to transmit a batch of data from said one of the personal computers after transmitting the printer identification code; and a receiver interface circuit electrically connected to one of the computer printers and including a data receiving means to receive the batch of data and the printer identification code from the transmitter interface circuit; and a means for checking a received printer identification code from the transmitter interface circuit with a preset identification code thereof, the data receiving means sending the batch of data to said one of the computer printers for printing only when the received printer identification code tallies with the preset printer identification code.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
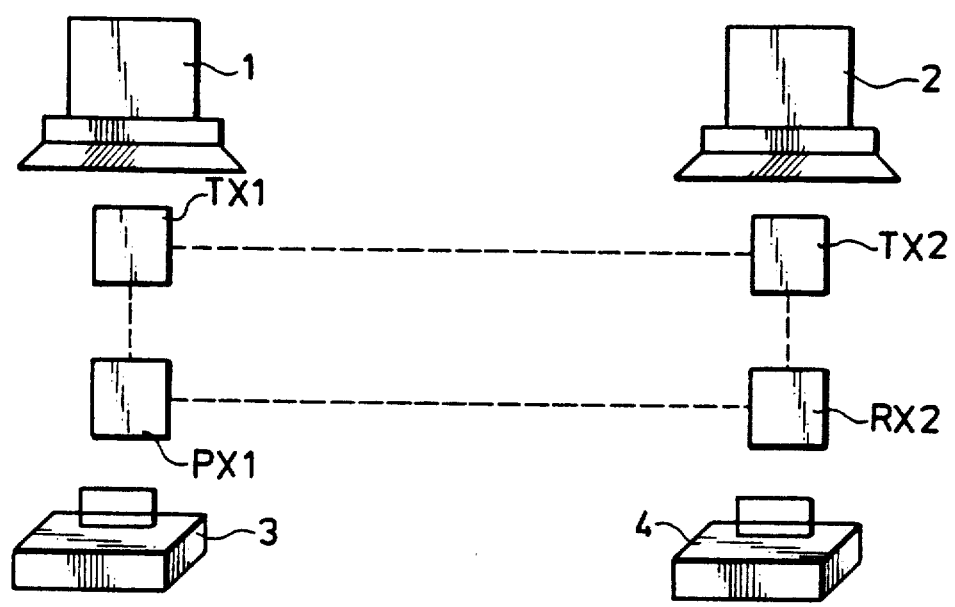
FIG. 1 is an illustration of the preferred embodiment of an automatic multiple personal computer/computer printer connecting system according to the present invention when used in a cascade connection to connect two personal computers to two computer printers.

Referring to FIG. 1, the preferred embodiment of an automatic multiple personal computer/computer printer connecting system according to the present invention is used to connect two personal computers, PC 1 and PC 2, to two computer printers, 3 and 4. (In this Figure, only two personal computers are connected to two computer printers in order to simplify the discussion of the preferred embodiment).

The preferred embodiment comprises a first transmitter interface circuit (TX1) connected to the I/O port of PC 1, a second transmitter interface circuit (TX2) connected to the I/O port of PC 2, a first receiver interface circuit (RX1) connected to the I/O port of computer printer 3, and a second receiver interface circuit (RX2)

connected to the I/O port of computer printer 4. The first and second transmitter interface circuits, (TX1) and (TX2), serially interconnect PC 1 and PC 2, while the first and second receiver interface circuits, (RX1) and (RX2), serially interconnect the computer printers 3 and 4.

Figure 2:
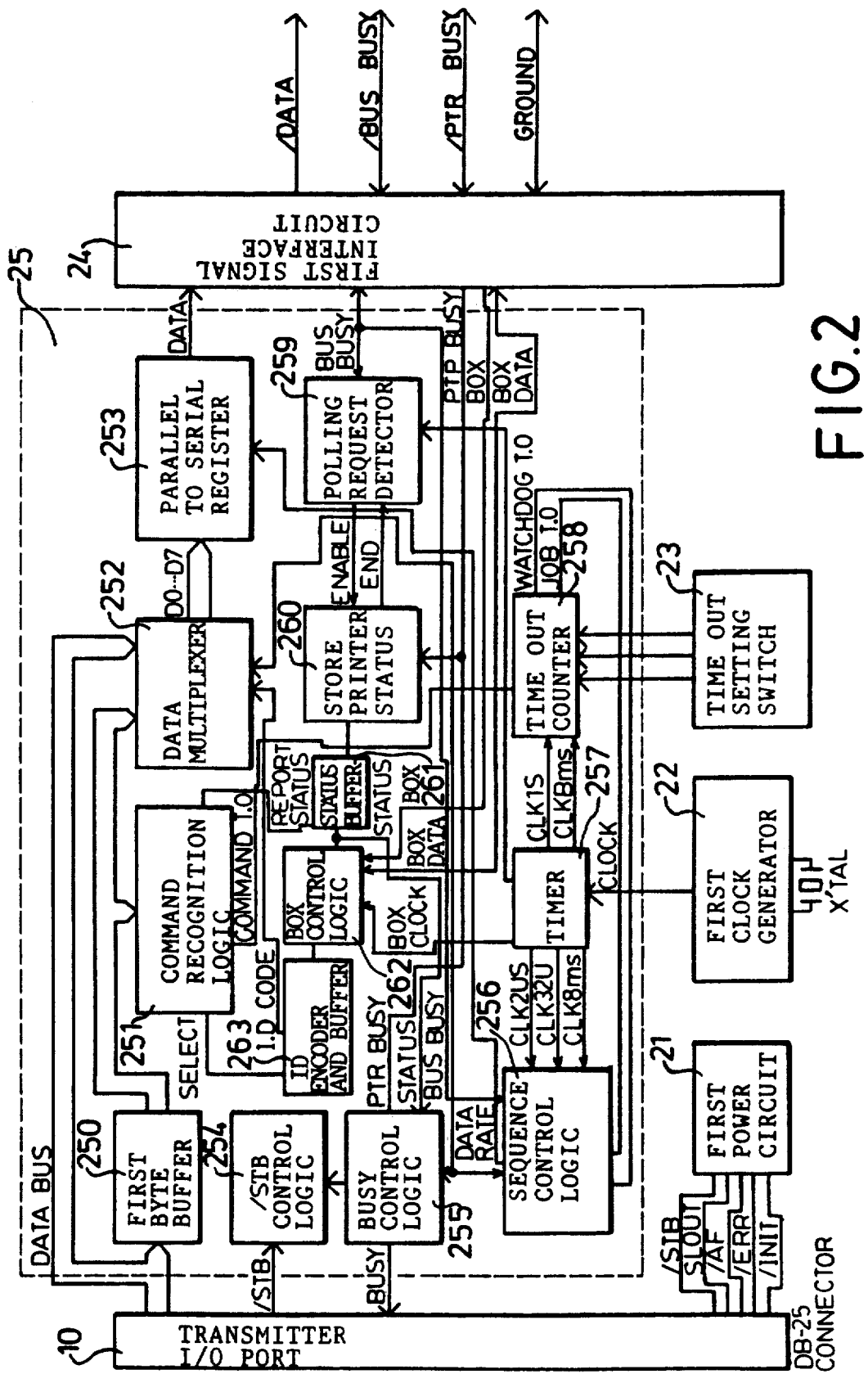
FIG. 2 is a schematic block diagram of a transmitter interface circuit of the preferred embodiment.
Figure 3:
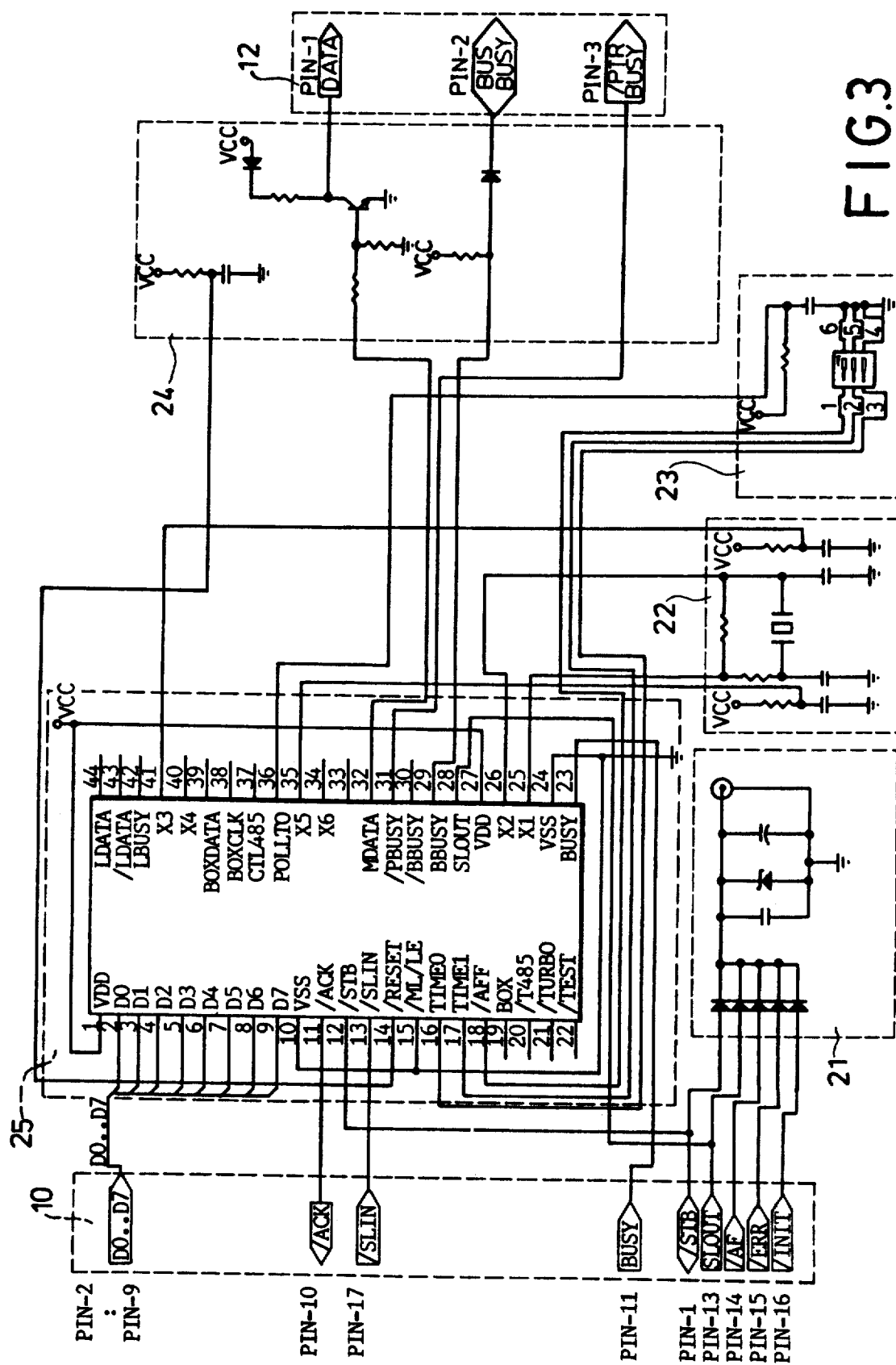
FIG. 3 is a schematic circuit diagram of the transmitter interface circuit shown in FIG. 2.

Referring to FIGS. 2 and 3, the transmitter interface circuit (TX1)/(TX2) comprises a first power circuit 21, a first clock generator 22, a time out setting switch 23, a first signal interface circuit 24 and a transmitter application specific integrated circuit (transmitter ASIC) 25.

The first power circuit 21 is connected to the I/O port 10 of PC 1/PC 2 and receives and conditions the following output control signals therefrom: /STB, SLOUT, /AF, /ERR and /INIT. The first power circuit 21 provides the required electrical power to the transmitter interface circuit (TX1)/(TX2). The first clock generator 22 includes an oscillator and associated RC components to provide a desired clock signal. The time out setting switch 23 includes a plurality of manual switches used to set a wait buffer period to temporarily stop operation of the connecting system after transmission of a batch of data has been completed. The first signal interface circuit 24 is provided to condition and to transmit/receive data and control signals.

The transmitter ASIC 25 is the heart of the transmitter interface circuit (TX1)/(TX2) and is connected to the first power circuit 21, the first clock generator 22, the time out setting switch 23 and to the first signal interface circuit 24. The transmitter ASIC 25 converts parallel data bytes from the personal computer into serial bit stream format and reads the operating status of the first and second receiver interface circuits, (RX1) and (RX2), so as to control when to transmit serial bit streams thereto. The transmitter ASIC 25 also provides information to the personal computer regarding the transmission situation.

The transmitter ASIC 25 comprises: a first byte buffer 250 to receive and temporarily store a byte output from the I/O port 10 of PC 1/PC 2; a command recognition logic 251 to identify whether a byte output of the first byte buffer 250 is a command byte or a data byte; a data multiplexer 252 to selectively receive the byte output of the first byte buffer 250 or the byte output at I/O port 10 of PC 1/PC 2; a parallel to serial register 253 to convert the output of the data multiplexer 252 from a parallel byte format to a serial bit stream format; a /STB control logic 254 to receive the /STB control signal from PC 1/PC 2; a BUSY control logic 255 to sequentially relay to PC 1/PC 2 the operating status of the receiver interface circuits (RX1) and (RX2); a sequence control logic 256 to generate a BUS BUSY control signal during transmission of a batch of data; a timer 257; a time out counter 258; a polling request detector 258 to detect the presence of a request for the operating status of the computer printers; a store computer printer status 260 to sequentially store the operating status of each computer printer; a status buffer 261; a BOX control logic circuit 262 electrically connected to an external control box (not shown); and an I.D. encoder and buffer 263.

Figure 4:
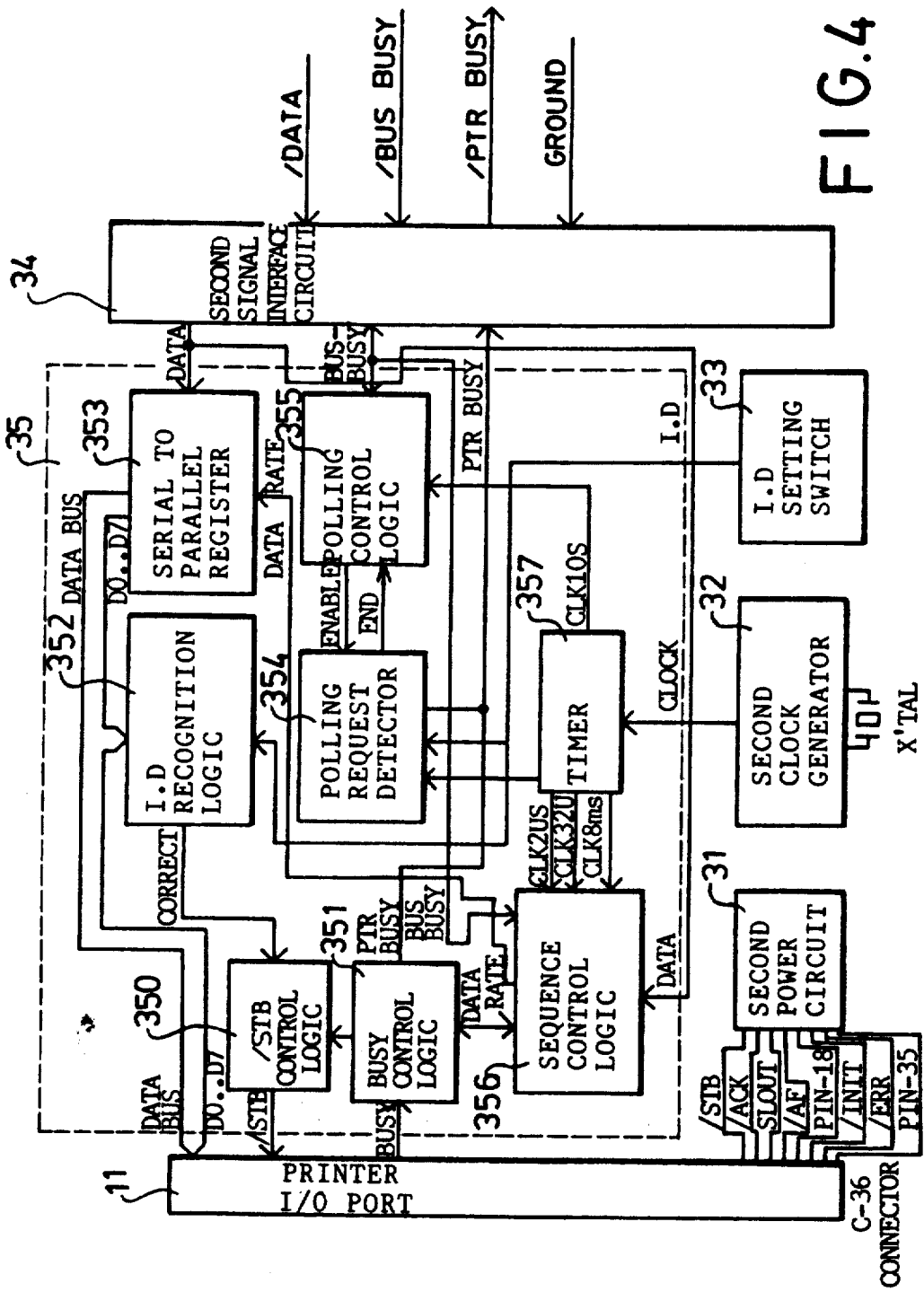
FIG. 4 is a schematic block diagram of a receiver interface circuit of the preferred embodiment.
Figure 5:
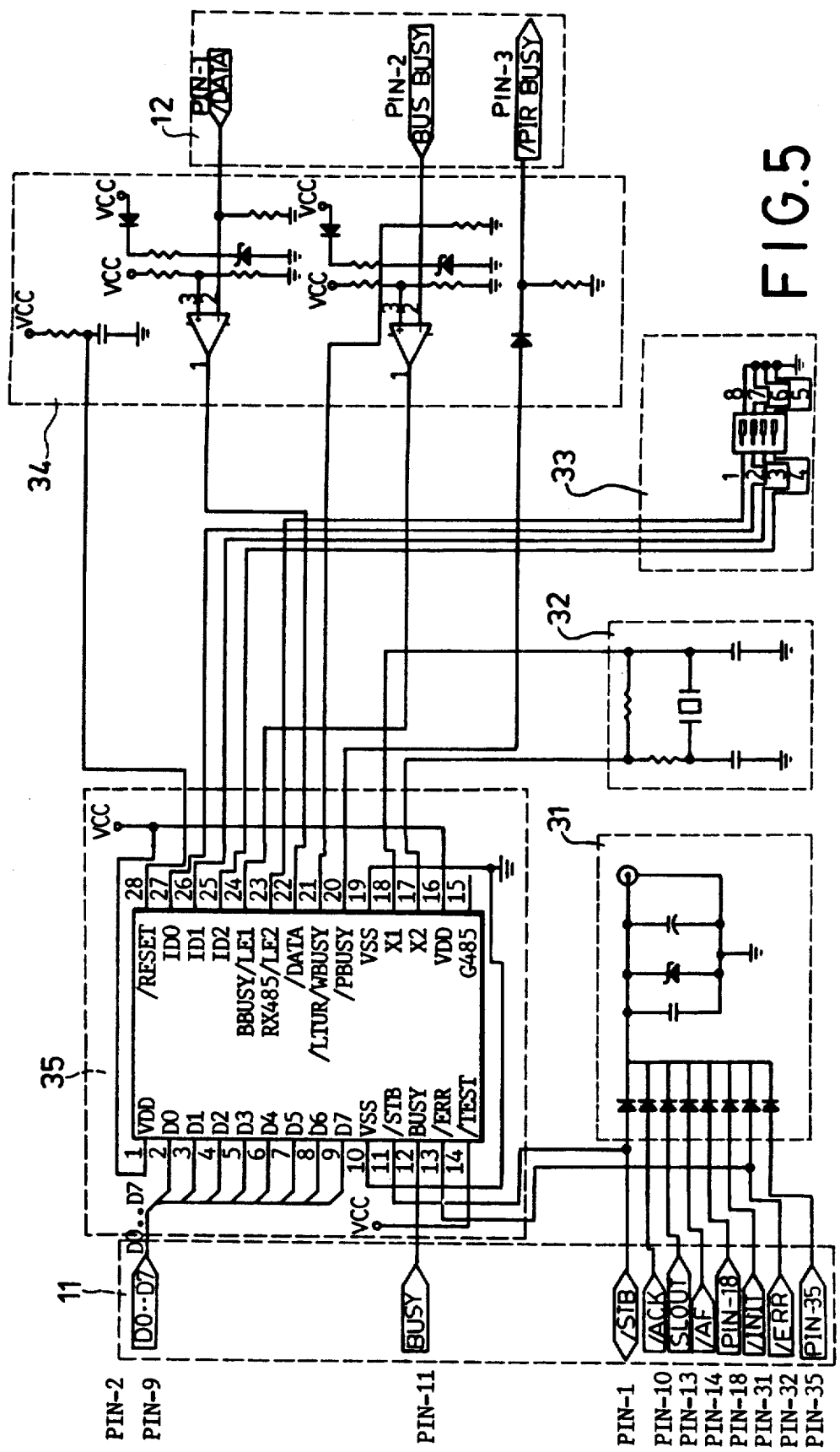
FIG. 5 is a schematic electrical circuit diagram of the receiver interface circuit shown in FIG. 4.

Referring to FIGS. 4 and 5, the receiver interface circuit (RX1)/(RX2) comprises a second power circuit 31, a second clock generator 32, an I.D. setting switch 33 a second signal interface circuit 34 and a receiver application specific integrated circuit (receiver ASIC) 35.

The second power circuit 31 is connected to and receives and conditions the following output control signals from the computer printer I/O port 11 of computer printer 3 or 4: /STB, /ACK, SLOUT, /AF, /INIT, /ERR, pin 18 and pin 25. The second power circuit 31 provides the required electric power to the receiver interface circuit (RX1)/(RX2). The second clock generator 32 includes an oscillator and associated RC components to provide a desired clock signal. The I.D. setting switch 33 includes a plurality of manual switches used to set the respective printer identification (I.D.) codes of the first and second receiver interface circuits, (RX1) and (RX2). The second signal interface circuit 34 is provided to condition and to receive/transmit data and control signals.

The receiver ASIC 35 is the heart of the receiver interface circuit (RX1)/(RX2) and is connected to the second power circuit 31, the second clock generator 32, the I.D. setting switch 33 and to the second signal interface circuit 34. The receiver ASIC 35 converts the serial bit stream format from the transmitter interface circuit (TX1)/(TX2) back into parallel data byte format and reads the operating status of the computer printers 3 and 4, so as to control when to transmit parallel data bytes thereto. The receiver ASIC 35 also provides information to the first and second transmitter interface circuits, (TX1) and (TX2), regarding the printing situation.

The receiver ASIC 35 comprises: a /STB control logic 350 to generate a /STB control signal to the computer printer; a BUSY control logic 351 to generate the /PTR BUSY signal; a printer identification (I.D.) recognition logic 352 to tally a printer I.D. code from the transmitter interface circuit (TX1)/(TX2) with the preset printer I.D. code of the receiver ASIC 35; a serial to parallel register 353 to convert the serial bit stream format from the transmitter interface circuit (TX1)/(TX2) into parallel byte format; a polling request detector 354 to detect the presence of a request for the operating status of the computer printer associated with the receiver interface circuit (RX1)/(RX2); a polling control logic 355 to receive the /BUS BUSY signal; a sequence control logic 356 to actuate the serial to parallel register 353; and a timer 357.

The operation of the preferred embodiment, with reference to the accompanying FIGS. 1-5, is as follows:

1. PC 1 is connected to the first transmitter interface circuit (TX1), while PC 2 is connected to the second transmitter interface circuit (TX2). Printer 3 is connected to the first receiver interface circuit (RX1), while computer printer 4 is connected to the second interface circuit (RX2).

Figure 6:
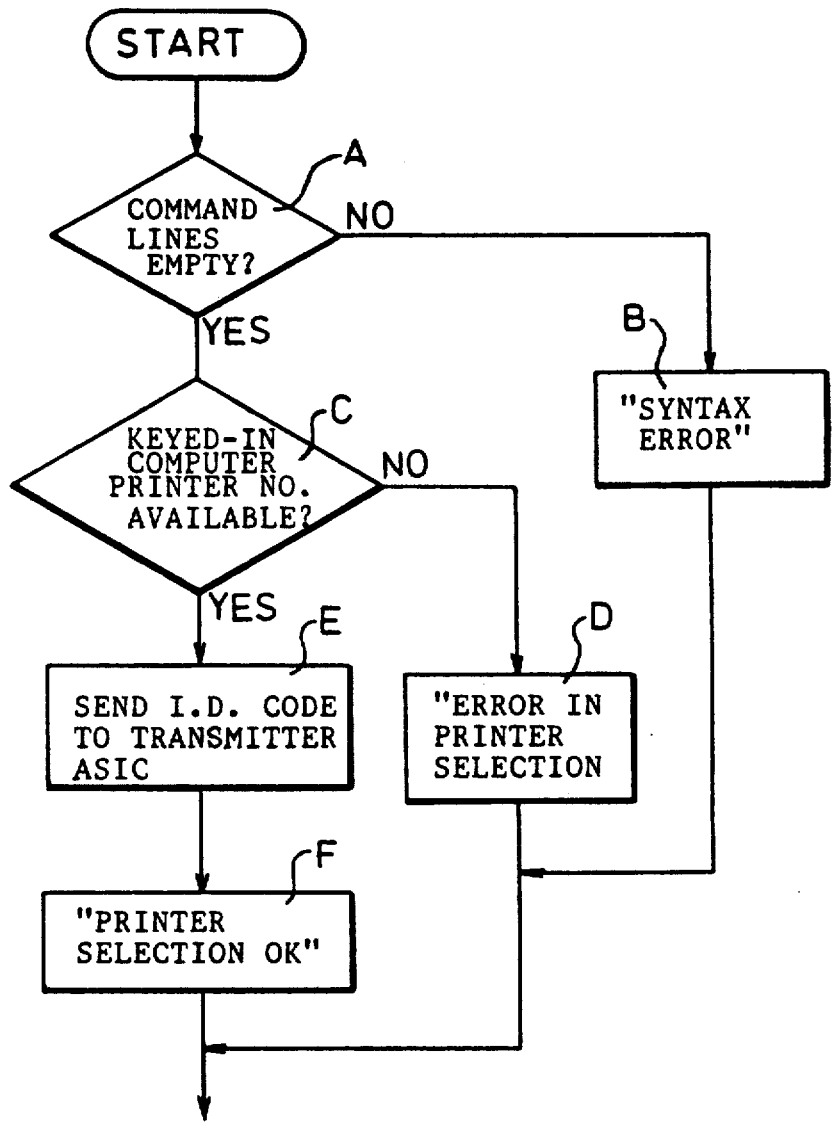
FIG. 6 is a flowchart of a printer select software routine utilized by a personal computer employing the preferred embodiment.

2. When PC 1, PC 2, computer printer 3 and computer printer 4 are switched on, the transmitter interface circuits, (TX1) and (TX2), and the receiver interface circuits, (RX1) and (RX2), are placed in an initial reset condition. Each of PC 1 and PC 2 can be selectively connected to one of the computer printers 3 or 4. The first and second transmitter interface circuits, (TX1) and (TX2), periodically check whether the computer printers 3 and 4 are in a ready or busy condition. Referring to FIG. 6, PC 1 and PC 2 may be programmed to contain a software routine to transmit a computer printer select command byte. The software routine initially checks whether the command lines (pins 2-9 of I/O port 10) are empty or not (instruction A). If the command lines are not empty, the phrase "SYNTAX ERROR" is displayed at the computer monitor (instruction B). If the command lines are empty, the software routine then checks whether the keyed-in computer printer number is available (instruction C). If the keyed-in computer printer number is not available, the phrase "ERROR IN PRINTER SELECTION" is displayed at the computer monitor (instruction D). If the keyed-in computer printer number is available, an I.D. code corresponding to the keyed-in computer printer number is sent to the transmitter ASIC 25 (instruction E) and the phrase "PRINTER SELECTION OK" is displayed at the computer monitor (instruction F). The I.D. code serves as the select command byte and is sent to the command recognition logic 251 of the transmitter ASIC 25 of the first and second transmitter interface circuits, (TX1) and (TX2), so as to confirm that the byte output at pins 2-9 of the I/O port 10 is actually a select command byte. The I.D. code of the selected receiver interface circuit, (RX1) or (RX2), is then stored in the I.D. encoder and buffer 263. If the byte output of the personal computer is a report command, the contents of the status buffer 261 is sent to the personal computer. The contents of the status buffer 261 is determined as follows: Each time data transmission has been completed or when no data is being transmitted, a request signal is sent to the polling request detector 259 every 8 seconds. The transmitter interface circuit (TX) then stores the /PTR BUSY status signal in the status buffer 261 for eventual transmission to the personal computer.

3. Assuming that PC 1 is electrically connected to computer printer 3, and that PC 2 is electrically connected to computer printer 4, PC 1 initially detects if the first transmitter interface circuit (TX1) is in a busy condition [The first transmitter interface circuit (TX1) is in a busy condition when the control signal BUSY is at a high voltage level]. If no busy condition is detected, PC 1 provides a parallel byte output at pins 2-9 of the I/O output port 10 thereof. A low voltage signal corresponding to the control signal /STB is generated at pin 1 of the I/O port 10 for reception by the /STB control logic 254 of the transmitter ASIC 25. The control signal /STB remains at the low voltage level until data transmission has been successfully completed. When the first transmitter interface circuit (TX1) receives a first byte from the I/O port 10, the sequence control logic 256 generates a low logic signal at pin 2 of a connector 12 corresponding to the control signal /BUS BUSY. This indicates that a byte from PC 1 is currently being handled and is used to inform PC 2 that the connecting system is currently being used, thereby preventing PC 2 from simultaneously using the connecting system. The first byte is temporarily stored at the first byte buffer 250 of the transmitter ASIC 25. At the same time, the first byte is received by the command recognition logic 251 to distinguish whether or not the first byte is a command byte. There are two types of command bytes: a select command byte to indicate which computer printer is to receive data from the personal computer; and a report command byte to request for the operating status of the computer printers. Upon reception of a second byte, the first transmitter interface circuit (TX1) begins to send the I.D. code of the selected computer printer to the data multiplexer 252, which I.D. code is stored in the I.D. encoder and buffer 263. The data multiplexer 252 outputs the I.D. code to the parallel to serial register 253 to convert the I.D. code into a serial bit stream format. The parallel byte stored in the first byte buffer 250 is then immediately sent to the data multiplexer 252 for conversion from a parallel data byte into a serial bit stream format. The serial output of the parallel to serial register 253 is sent to the receiver interface circuits, (RX1) and (RX2), via the first signal interface circuit 24. The succeeding byte outputs of the personal computer are transmitted to the receiver interface circuits, (RX1) and (RX2), in a similar manner. When data transmission has been completed and after the wait buffer period of the time out counter 258 has expired, the control signal /BUS BUSY at pin 2 of the connector 12 returns to a high logic state, thereby informing PC 2 that the connecting system is now available for use. The first transmitter interface circuit (TX1) automatically generates a request signal to the polling request detector 259 so as to sequentially store the operating status of the computer printers 3 and 4 into the status buffer 261.

The operating status of the first and second receiver interface circuits, (RX1) and (RX2), is sent as the control signal /PTR BUSY to the transmitter ASIC 25 of the first and second transmitter interface circuits, (TX1) and (TX2), to thereby control the transmission of data. Moreover, a simple keypad may be incorporated to select the computer printer to be used. An external control box (not shown) may be connected to the BOX control logic 262 of each transmitter interface circuit, (TX1) and (TX2). The external control box is provided with a computer printer select switch and a plurality of light emitting diodes (LEDs) to facilitate detection of the operating status of each computer printer and to indicate whether the connecting system is currently in use or not. The external control box can thus be used to replace the printer select command software routine of the personal computer (Refer to the flowchart shown in FIG. 6).

4. Once the first and second receiver interface circuits, (RX1) and (RX2), receive the serial bit stream corresponding to the first byte output of the personal computer (that is, the I.D. code), the sequence control logic 356 similarly receives the /BUS BUSY control signal to activate the serial to parallel register 353 to commence conversion of the serial bit stream format into a parallel byte format. The parallel byte output of the serial to parallel register 353 is then received by the I.D. recognition logic 352 which checks whether the received printer identification (I.D.) code belongs to the first receiver interface circuit (RX1) or to the second receiver interface circuit (RX2). If data from the first transmitter interface circuit (TX1) is sent to the first receiver interface circuit (RX1), the printer I.D. code transmitted should tally with that of the first receiver interface circuit (RX1). A correct code signal to the /STB control logic 350 is generated to actuate the same. An error in printer I.D. code is detected by the second receiver interface circuit (RX2), thereby preventing the same from receiving additional data. When the first receiver interface circuit (RX1) receives the second parallel byte from the first transmitter interface circuit (TX1), the logic state at pin 11 of the computer printer I/O port 11 is checked to determine whether the computer printer is in a ready or busy condition (A busy condition is indicated by a high logic state). If no busy condition is detected, the /STB control logic 350 generates a low logic signal corresponding to the control signal /STB to pin 1 of the computer printer I/O port 11. This permits computer printer 3 to receive data and print the same. The control signal /STB remains at a low logic state condition until printing of data has been accomplished. At the same time, the computer printer operating status signal BUSY is received by the busy control logic 351, which generates the control signal /PTR BUSY for transmission at pin 3 of the connector 12. The control signal /PTR BUSY is received by the first transmitter interface circuit (TX1) to inform the same when data should be sent to the first receiver interface circuit (RX1).

After the first transmitter interface circuit (TX1) has concluded data transmission, a request for the operating status of the first and second receiver interface circuits, (RX1) and (RX2), is generated. This request is also known as the polling request. The receiver ASIC 35 of the first and second receiver interface circuits, (RX1) and (RX2), sequentially send the control signal /PTR BUSY to the first transmitter interface circuit (TX1). The receiver ASIC 35 of the first and second receiver interface circuits, (RX1) and (RX2), can, after a predetermined time period wherein no data is being transmitted (after the wait buffer period has expired), automatically send the operating status thereof for reception by the first transmitter interface circuit (TX1).

5. The time out setting switch 23 of the transmitter interface circuit (TX1)/(TX2) is used to provide a wait buffer period after the transmission of a first batch of data from a first personal computer to ensure that printing of the first batch of data has been completed. After the wait buffer period has expired, the connecting system can commence transmission and printing of a new batch of data from the same or from another personal computer. The time out setting switch 23 can be provided with a select switch to instruct the computer printer that an automatic form feed action will be executed after printing of each batch of data has been accomplished.

The preferred embodiment of an automatic multiple personal computer/computer printer connecting system can be used to connect a plurality of personal computers to at least one computer printer or to connect a plurality of printers to at least one personal computer in different connection arrangements, examples of which are as follows:

1. In a cascade connection, a ring network is employed to link the personal computers to the computer printers (Refer to FIG. 1).

Figure 7A:
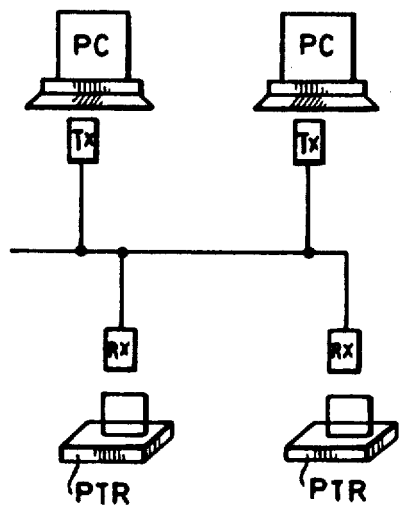
FIG. 7A illustrates the present invention when used in a bus connection.

2. In a bus connection, the personal computers and the computer printers are linked together via a single communications network (Refer to FIG. 7A).

Figure 7B:
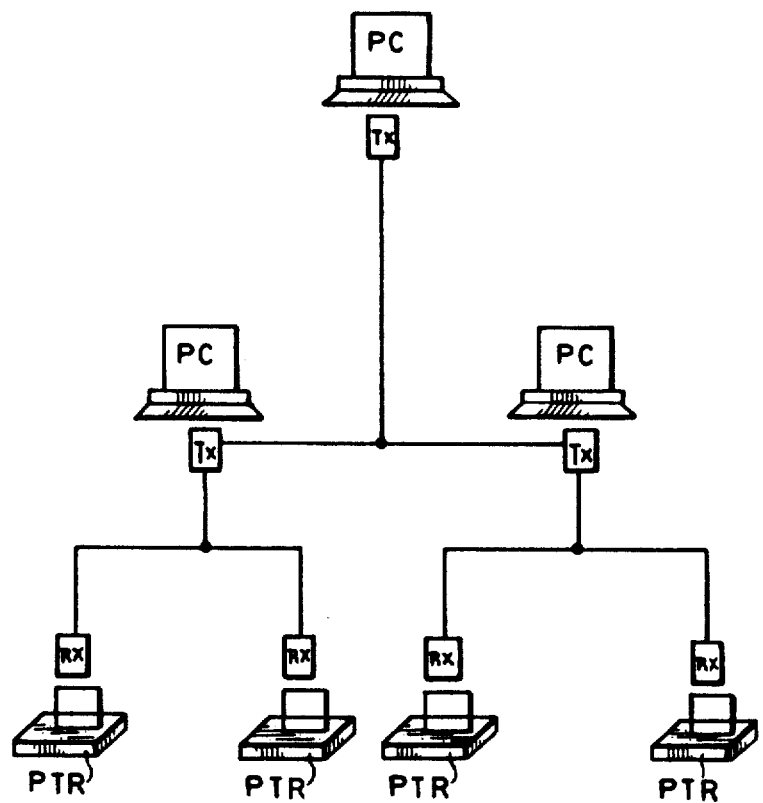
FIG. 7B illustrates the present invention when used in a tree connection.

3. In a tree connection, the personal computers and the computer printers are linked together via a plurality of branches (Refer to FIG. 7B).

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A connecting system to connect a plurality of personal computers to at least one computer printer or to connect a plurality of computer printers to at least one personal computer, said connecting system comprising:
  a transmitter interface circuit electrically connected to one of said personal computers and including means for detecting and informing said one of said personal computers as to which one of said computer printers is in use, and a data transmitting means to generate and transmit a printer identification code of a selected one of said computer printers when none of said computer printers is in use and to transmit a batch of data from said one of said personal computers after transmitting said printer identification code; and
  a receiver interface circuit electrically connected to one of said computer printers and including a data receiving means to receive said batch of data and said printer identification code from said transmitter interface circuit and means for checking a received printer identification code from said transmitter interface circuit with a preset printer identification code, said data receiving means sending said batch of data to said one of said computer printers for printing only when the received printer identification code agrees with said preset printer identification code,
  wherein each of said computer printers generates a printer busy signal when printing; said data transmitting means further comprises means for generating a bus busy signal when said batch of data is being transmitted; said detecting and personal computer informing means comprises a busy control logic means electrically connected to said one of said personal computers to detect the presence of said bus busy signal and said printer busy signal.

2. A connecting system to connect a plurality of personal computers to at least one computer printer or to connect a plurality of computer printers to at least one personal computer, said connecting system comprising:
  a transmitter interface circuit electrically connected to one of said personal computers and including means for detecting and informing said one of said personal computers as to which one of said computer printers is in use, and a data transmitting means to generate and transmit a printer identification code of a selected one of said computer printers when none of said computer printers is in use and to transmit a batch of data from said one of said personal computers after transmitting said printer identification code; and
  a receiver interface circuit electrically connected to one of said computer printers and including a data receiving means to receive said batch of data and said printer identification code from said transmitter interface circuit and means for checking a received printer identification code from said transmitter interface circuit with a preset printer identification code, said data receiving means sending said batch of data to said one of said computer printers for printing only when the received printer identification code agrees with said preset printer identification code,
  wherein said data transmitting means further comprises means for providing a wait buffer period to temporarily stop operation of said connecting system after transmitting said batch of data to ensure printing of said batch of data has been accomplished before a new batch of data can be transmitted.

3. A connecting system to connect a plurality of personal computers to at least one computer printer or to connect a plurality of computer printers to at least one personal computer, said connecting system comprising:
  a transmitter interface circuit electrically connected to one of said personal computers and including means for detecting and informing said one of said personal computers as to which one of said computer printers is in use, and a data transmitting means to generate and transmit a printer identification code of a selected one of said computer printers when none of said computer printers is in use and to transmit a batch of data from said one of said personal computers after transmitting said printer identification code; and a receiver interface circuit electrically connected to one of said computer printers and including a data receiving means to receive said batch of data and said printer identification code from said transmitter interface circuit and means for checking a received printer identification code from said transmitter interface circuit with a preset printer identification code, said data receiving means sending said batch of data to said one of said computer printers for printing only when the received printer identification code agrees with said preset printer identification code, wherein said receiver interface circuit further comprises means for instructing said one of said computer printers to execute an automatic form feed instruction after printing of said batch of data has been accomplished.

4. The connecting system as claimed in claim 3, wherein said data transmitting means further comprises means for providing a wait buffer period to temporarily stop operation of said connecting system after transmitting said batch of data to ensure printing of said batch of data has been accomplished before a new batch of data can be transmitted.

5. The connecting system as claimed in claim 1, 2 or 3, wherein said transmitter interface circuit further comprises means for conditioning output control signals of said one of said personal computers so as to supply electric power to said transmitter interface circuit.

6. The connecting system as claimed in claim 1, 2 or 3 wherein said receiver interface circuit further comprises means for conditioning output control signals of said one of said computer printers so as to supply electric power to said receiver interface circuit.

7. The connecting system as claimed in claim 2 or 3, wherein each of said computer printers generates a printer busy signal when printing; said data transmitting means further comprises means for generating a bus busy signal when said batch of data is being transmitted; said detecting and personal computer informing means comprises a busy control logic means electrically connected to said one of said personal computers to detect the presence of said bus busy signal and said printer busy signal.

8. The connecting system as claimed in claim 1, 2 or 3 wherein said data transmitting means comprises a parallel to serial register means to transmit said printer identification code and said batch of data in a serial bit stream format.

9. The connecting system as claimed in claim 8, wherein said data receiving means comprises a serial to parallel register means to convert the serial bit stream format back into a parallel byte format.

10. The connecting system as claimed in claim 9, wherein said receiver interface circuit further comprises means for detecting the presence of said bus busy signal to actuate said serial to parallel register means to commence conversion of the serial bit stream format back into the parallel byte format.

11. The connecting system as claimed in claim 1, 2 or 3 wherein said printer identification code checking means comprises:

identification code setting switch means for setting said preset printer identification code; and identification code recognition logic means responsive to said setting switch means for generating a correct code signal when the received printer identification code agrees with said preset printer identification code.

12. The connecting system as claimed in claim 9, wherein said data receiving means further comprises a strobe control logic means actuated by said correct code signal to generate a strobe control signal to said one of said computer printers to permit said one of said computer printers to receive said batch of data.

* * * * *